(12) United States Patent
Faulkner

(10) Patent No.: US 11,285,646 B2
(45) Date of Patent: Mar. 29, 2022

(54) METHOD FOR MOLDING A CLOSURE AND GASKET COMBINATION

(71) Applicant: F&S Tool, Inc., Erie, PA (US)

(72) Inventor: James D. Faulkner, Erie, PA (US)

(73) Assignee: F&S Tool, Inc., Erie, PA (US)

( * ) Notice: Subject to any disclaimer, the term of this patent is extended or adjusted under 35 U.S.C. 154(b) by 148 days.

(21) Appl. No.: 16/544,791

(22) Filed: Aug. 19, 2019

(65) Prior Publication Data
US 2020/0061893 A1 Feb. 27, 2020

Related U.S. Application Data

(60) Provisional application No. 62/722,460, filed on Aug. 24, 2018.

(51) Int. Cl.
| | |
|---|---|
| *B29C 45/16* | (2006.01) |
| *B29C 45/44* | (2006.01) |
| *B29C 45/00* | (2006.01) |
| *B65D 41/04* | (2006.01) |
| *B65D 51/16* | (2006.01) |

(Continued)

(52) U.S. Cl.
CPC .......... *B29C 45/16* (2013.01); *B29C 45/0001* (2013.01); *B29C 45/162* (2013.01); *B29C 45/1615* (2013.01); *B29C 45/1628* (2013.01); *B29C 45/1675* (2013.01); *B29C 45/1676* (2013.01); *B29C 45/4407* (2013.01); *B65D 41/0457* (2013.01); *B65D 51/1622* (2013.01); *B29K 2021/003* (2013.01); *B29L 2031/265* (2013.01); *B29L 2031/565* (2013.01)

(58) Field of Classification Search
None
See application file for complete search history.

(56) References Cited

U.S. PATENT DOCUMENTS

| | | | | |
|---|---|---|---|---|
| 1,916,692 A | * | 7/1933 | Scribner | .................. B29D 1/00 264/318 |
| 4,421,705 A | | 12/1983 | Hatakeyama et al. | |

(Continued)

FOREIGN PATENT DOCUMENTS

| | | |
|---|---|---|
| CN | 103287231 A | 9/2013 |
| CN | 104192412 A | 12/2014 |

(Continued)

OTHER PUBLICATIONS

International Search Report received in related International Application No. PCT/US19/47240 dated Oct. 14, 2019.

(Continued)

*Primary Examiner* — Edmund H Lee
(74) *Attorney, Agent, or Firm* — The Marbury Law Group, PLLC

(57) ABSTRACT

What is presented is a method of forming a closure with a sealing gasket in an injection molding machine that has a center rotating cube. The center rotating cube comprises a plurality of mold back halves each comprising cores and a thread unscrewing mechanism. Each core is shaped to form a closure that has a thread and an anti-rotation feature. The method comprises the steps of forming a closure with a through hole, rotating the core to create a gap between the formed closure and the core, and injecting a compressible material through the through hole and into the gap to form a sealing gasket.

9 Claims, 3 Drawing Sheets

(51) Int. Cl.
  *B29K 21/00* (2006.01)
  *B29L 31/56* (2006.01)
  *B29L 31/26* (2006.01)

(56) References Cited

U.S. PATENT DOCUMENTS

| | | |
|---|---|---|
| 4,470,936 A | 9/1984 | Potter |
| 5,037,595 A | 8/1991 | Kornelis |
| 6,551,093 B2 | 4/2003 | Taha |
| 6,964,346 B1 | 11/2005 | Taber et al. |
| 7,210,917 B2* | 5/2007 | Lai .................. B29C 45/1615 264/255 |
| 7,998,390 B2 | 8/2011 | Olaru et al. |
| 8,747,100 B2 | 6/2014 | Grimm |
| 9,539,754 B2 | 1/2017 | De Wilde et al. |
| 9,943,998 B2* | 4/2018 | Ropele ................. B65D 53/06 |
| 2003/0098287 A1 | 5/2003 | Taber et al. |
| 2004/0119200 A1* | 6/2004 | Gram .................. B29C 45/162 264/255 |
| 2005/0140053 A1 | 6/2005 | Laletal |
| 2006/0244178 A1* | 11/2006 | Armbruster ........... B29C 45/045 264/255 |
| 2015/0016755 A1 | 1/2015 | Sheikh |

FOREIGN PATENT DOCUMENTS

| | | |
|---|---|---|
| CN | 203997340 U | 12/2014 |
| DE | 20 2005 003 069 U1 | 7/2006 |
| DE | 10 2015 114 369 A1 | 3/2017 |
| EP | 0 806 369 A1 | 11/1997 |
| GB | 2 409 447 A | 6/2005 |

OTHER PUBLICATIONS

Written Opinion of the International Searching Authority received in related International Application No. PCT/US19/47240 dated Oct. 14, 2019.
GL Plastics, "2 Injection molding: in two injection steps", https://www.gl-plastics.nl/en/manufacturing/2k-injection-molding, 4 pages.
International Preliminary Report on Patentability received from the The International Bureau of WIPO in related International Application No. PCT/US2019/047240 filed Mar. 11, 2021.

* cited by examiner

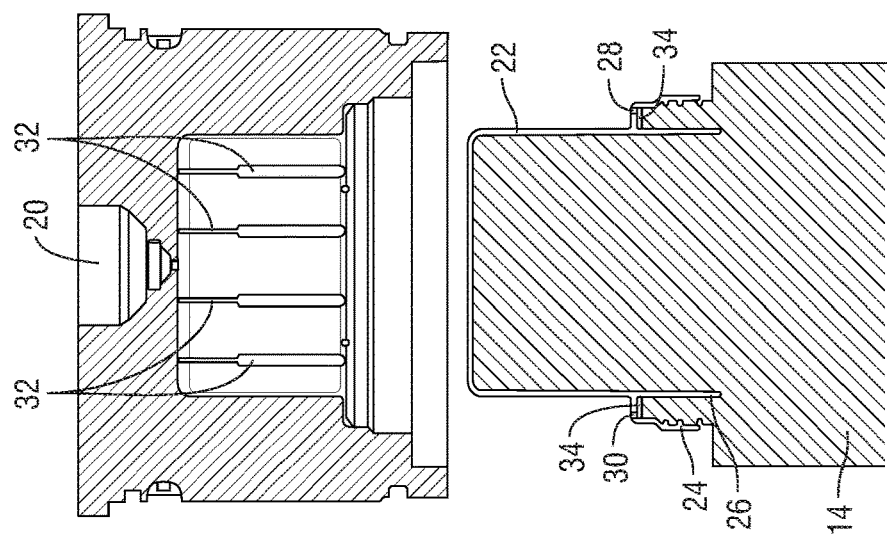
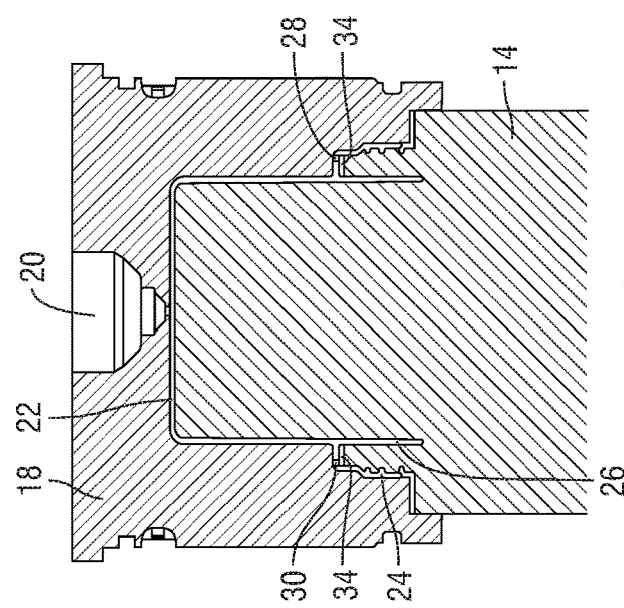
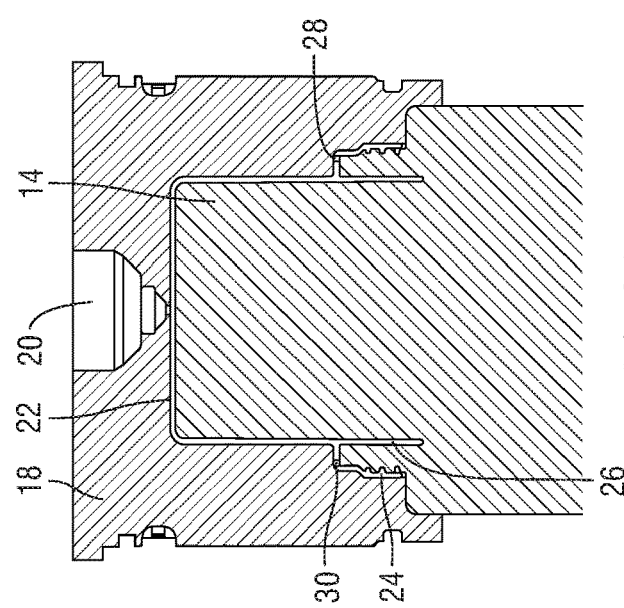

METHOD FOR MOLDING A CLOSURE AND GASKET COMBINATION

BACKGROUND

Caps or closures used for containers that hold liquids often require gaskets within them to provide a leak-proof seal. There are a variety of ways to create these closures including forming the gasket separate from the closure wherein the gasket is installed either by hand or other mechanical means. However, these prior art methods are costly and in some instances the performance is limited. What is presented is an improved method for creating a closure with a gasket formed directly into the freshly molded closure using a single cube mold injection molding machine.

SUMMARY

What is presented is a method of forming a closure with a sealing gasket in an injection molding machine that has a center rotating cube that comprises a plurality of mold back halves. Each mold back half comprises cores and a thread unscrewing mechanism. Each core is shaped to form a closure that has a thread and an anti-rotation feature. The method comprises first forming a closure with a through hole, then rotating the core to create a gap between the formed closure and the core, and finally injecting a compressible material through the through hole and into the gap to form a sealing gasket. The closure may be single walled or double walled and the gasket may preferably be made of thermoplastic elastomer but may be any material that can form a seal in the closure.

In various embodiments, the closure is also formed with one or more vent holes and the anti-rotation feature of the closure is one of a rib, ribs, and knurls. In various other embodiments, the anti-rotation feature of the closure is on the outside of the closure or the inside of the closure.

Those skilled in the art will realize that this invention is capable of embodiments that are different from those shown and that details of the devices and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

FIG. 2A shows a cross section of mold half showing the creation of a closure;

FIG. 2B shows a cross section of the mold half of FIG. 2A after the closure is unscrewed slightly to create the gap for the gasket;

FIG. 2C shows the formed closure of FIG. 2A with a through hole and a vent hole with the gap for the gasket present and the anti-rotation feature in the cavity;

DETAILED DESCRIPTION

Figure 1:
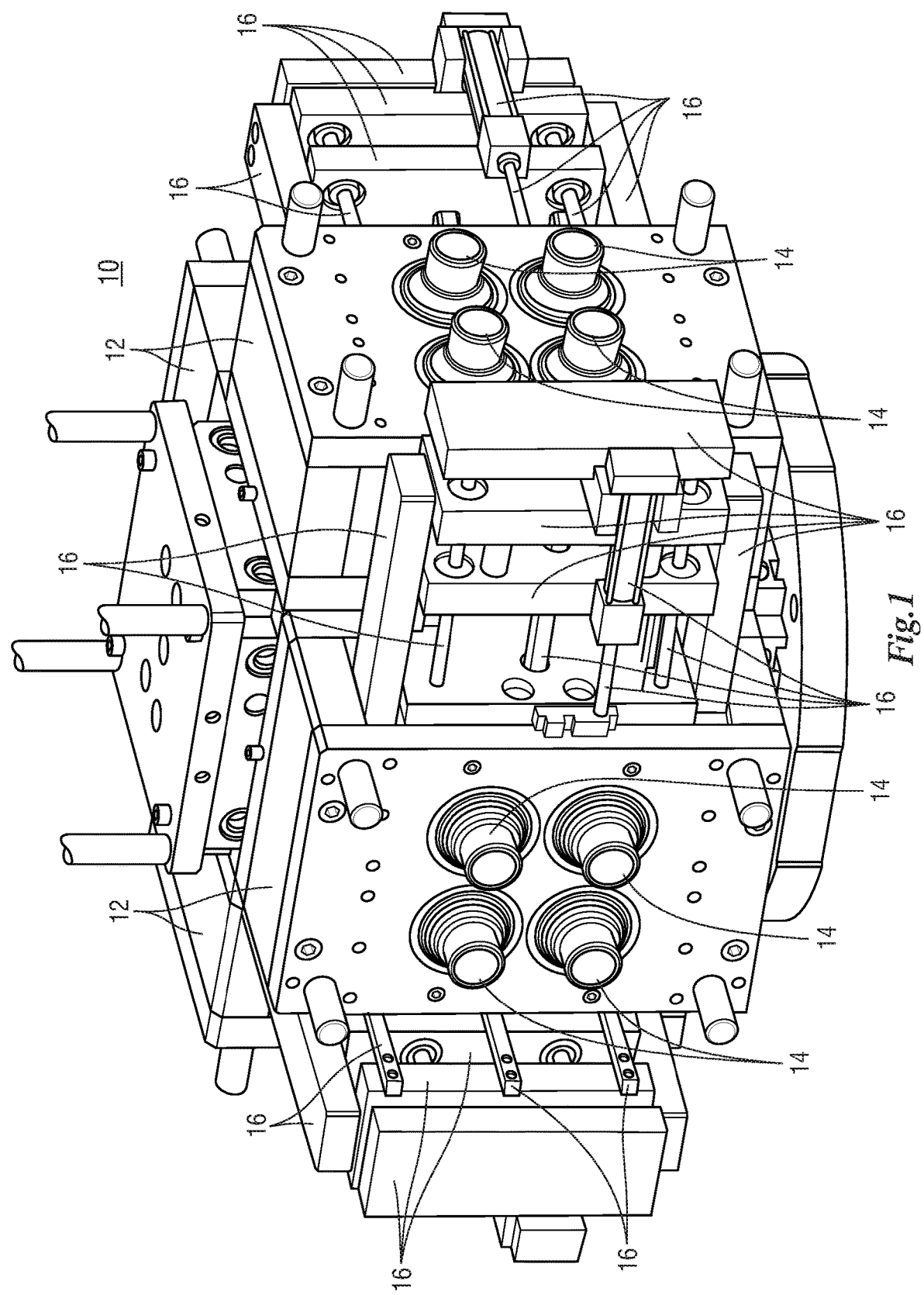
FIG. 1 shows the center cube structure section of a cube two-injection unit injection molding machine showing mold halves with unscrewing racks.

Referring to the drawings, variations of corresponding parts in form or function that are depicted in the figures are described. It will be understood that variations in the embodiments can generally be interchanged without deviating from the invention.

Injection molding is a manufacturing process for producing parts by injecting molten material into a cavity or mold. Injection molding machines comprise various components that work together to ultimately form a plastic part that is ejected from the mold. Plastic, in pellet or flake form, is changed from a solid to a liquid by the application of heat. The injection molding machine forces the liquid plastic into the mold. The liquid plastic is cooled into a solid shape and the finished plastic part is removed from the mold.

The basic parts of the mold comprise two mold halves into which the cavity is created and an ejector system for removal of the finally formed part. The mold halves are mounted to platens that support the mold halves on the injection molding machine. In two-mold or dual injection molding machines, two separate molds are mounted in a linear fashion to a single injection molding machine with separate injection units on either side of two molds that each supply one or the other mold. Cube molds are a variation of dual injection mold in which the center support structure is a cube that has four faces that are rotatable between the two molds in the dual injection molding machine. Each of the four faces could have a different mold half or the same mold half that allows two different treatments to be performed on the same part.

Closures or caps are often formed using injection molding systems. These closures are often formed to fit onto containers that hold liquids and as such they require the addition of sealing gaskets to form a liquid seal to prevent the fluid within those containers from leaking. There are many ways to form such gaskets in the prior art. In some instances, the gaskets are formed separately from the closure and either manually or mechanically fit into the closure. There have been attempts to form the gaskets directly into the closure after the closure is formed. What is presented is an improved method for forming a closure and gasket combination in a single cube dual injection molding machine.

The method disclosed herein, as illustrated in FIG. 1, requires a dual injection molding machine having a center rotating cube 10, wherein the center rotating cube comprises a plurality of mold back halves 12 each comprising cores 14 and a thread unscrewing mechanism 16. FIG. 1 shows a portion of the core 14 wherein each core 14 is shaped to form a closure that has a thread. As described in more detail later, the core 14 would also form an anti-rotation feature in the closure but this feature is not shown in FIG. 1.

As best understood by comparing FIGS. 1 and 2A, the center rotating cube 10 is rotated to present one mold back half 12 to a corresponding mold front half (not shown) on one side of the dual injection molding machine. The corresponding mold front half has corresponding cavities 18 that between the two create a cavity in the shape of the closure 22 to be formed. The corresponding cavity 18 has an injection nozzle 20 through which melted plastic is injected into the cavity to form the closure 22. The closure 22 thus formed has threads 24 and the embodiment shown in the figures is double walled as indicated by the presence of the wall 26 opposite the thread 24. It is understood that the closure 22 may be single walled (i.e., without a wall opposite the thread) without deviating from the scope of the invention. The closure 22 is formed with a through hole 28 and at least one vent hole 30. The closure 22 is also formed with an anti-rotation feature 32 that can be seen in the upper portion of FIG. 2C on the corresponding cavity 18 as a series of ribs on the outside of the closure. Other configurations of anti-rotation features 32 such as a single rib, knurls, or other features may be used.

As shown in FIG. 2B, the core 14 is then rotated and the anti-rotation feature 32 holds the closure 22 in place allowing it to be pulled away from the core 14 to create a small gap 34 that has the dimensions of the gasket that will be formed within the closure 22. The gap 34 is any thickness required by the specific application. It will be understood that the anti-rotation feature 32 could instead be formed on the inside of the closure 22. As shown in FIG. 2C, the center rotating cube 10 (shown in FIG. 1) is then pulled away from the mold half and the core 14 is rotated to the next position.

Figures 3A, 3B:
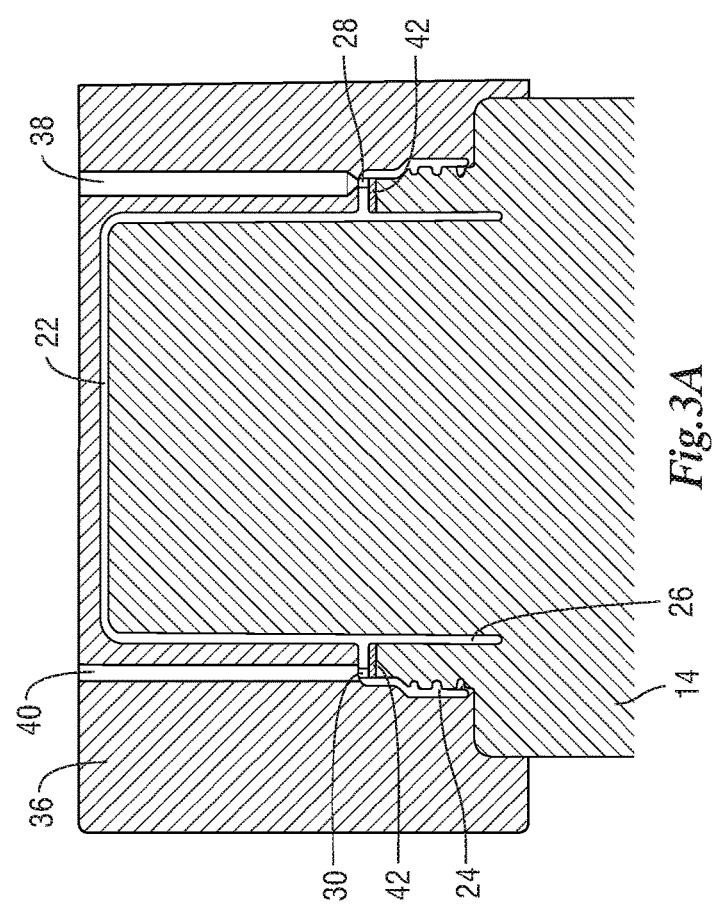
FIG. 3A shows the closure of FIG. 2A positioned for the injection of the gasket material into the gap.
FIG. 3B shows the final formed closure of FIG. 2A with the gasket formed in the gap and the cavity and orientation feature.

At the next position, as best understood by comparing FIGS. 1 and 3, the center rotating cube 10 (shown in FIG. 1) is rotated to present the mold back half 12 to a corresponding mold front half (not shown) on the other side of the dual injection molding machine. The core 14 is inserted into a second corresponding cavity 36. This second corresponding cavity 36 has a second injection nozzle 38 that lines up with the through hole 28 in the closure 22. The second corresponding cavity 36 also has at least one vent 40 that corresponds to the vent hole 30 in the closure. It will be understood that the second corresponding cavity 36 has as many vents 40 as there are vent holes 30. Gasket material is injected through the through hole 28 to form a gasket 42 in the gap 34 (shown in FIGS. 2B and 2C). Enough material is injected to fill the gap and seal the vent holes 30. The gasket material is preferably a thermoplastic elastomer, but it may be any material that can form a seal. After the gasket 42 is formed in the closure 22, the center rotating cube 10 is pulled away as shown in upper portion of FIG. 3B and rotated to eject the fully formed closure 22.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

The invention claimed is:

1. A method of injection molding closure and sealing gasket combinations in a machine that has a center rotating cube, wherein the center rotating cube comprises a plurality of mold back halves each comprising cores and a thread unscrewing mechanism, wherein each core is shaped to form a respective closure that has a thread and an anti-rotation feature, the method comprising:
   presenting the cores of the plurality of mold back halves into corresponding cavities of a mold front half to define corresponding spaces between the cores and the mold front half, each space in the shape a closure to be formed;
   forming closures in the spaces between the cores and the mold front half, each of the closures including threads and an anti-rotation feature, and each of the closures defining a through hole;
   with the threads of each of the closures held in place by the corresponding anti-rotation-feature of the respective closure, rotating the cores relative to the threads, using the thread unscrewing mechanism, to define gaps between the closures and the cores; and
   injecting a compressible material, through the through holes in the closures, to fill the gaps and form a respective sealing gasket on each of the closures.

2. The method of claim 1, wherein each of the closures further defines one or more vent holes.

3. The method of claim 1, wherein the anti-rotation feature of each of the closures is one of a rib, ribs, and knurls.

4. The method of claim 1, wherein the anti-rotation feature of each of the closures is on an outside of the closure.

5. The method of claim 1, wherein the anti-rotation feature of each of the closures is on an inside of the closure.

6. The method of claim 1, wherein the each of the sealing gaskets is made of thermoplastic elastomer.

7. The method of claim 1, wherein each of the closures is single walled.

8. The method of claim 1, wherein each of the closures is double walled.

9. The method of claim 8, wherein each of the sealing gaskets is formed between corresponding double walls of the respective closure.

\* \* \* \* \*